United States Patent [19]

Sumitomo

[11] Patent Number: 4,937,272
[45] Date of Patent: Jun. 26, 1990

[54] EXPANDED THERMOPLASTIC RESINOUS MATERIALS AND PROCESS FOR PRODUCTION THEREOF

[75] Inventor: Takashi Sumitomo, Ichihara, Japan

[73] Assignee: Idemitsu Kosan Co., Ltd., Tokyo, Japan

[21] Appl. No.: 292,378

[22] Filed: Dec. 30, 1988

[30] Foreign Application Priority Data

Jan. 13, 1988 [JP] Japan .................................. 63-003845

[51] Int. Cl.$^5$ ................................................ C08J 9/18
[52] U.S. Cl. .......................................... 521/59; 521/56; 521/60; 521/139; 521/146
[58] Field of Search ........................................ 521/56, 60

[56] References Cited

U.S. PATENT DOCUMENTS

| 4,680,353 | 7/1987 | Ishihara et al. | 526/159 |
| 4,772,441 | 9/1988 | Voss | 521/60 |
| 4,774,301 | 9/1988 | Campbell, Jr. et al. | 526/161 |
| 4,778,829 | 10/1988 | Ichimura et al. | 521/60 |
| 4,798,749 | 1/1989 | Arch et al. | 521/60 |
| 4,808,680 | 2/1989 | Schmidt et al. | 526/160 |
| 4,839,396 | 6/1989 | Tusim | 521/60 |

FOREIGN PATENT DOCUMENTS

EP 210615  4/1987  European Pat. Off. .

*Primary Examiner*—Morton Foelak
*Attorney, Agent, or Firm*—Frishauf Holtz Goodman & Woodward

[57] ABSTRACT

Expanded thermoplastic resinous materials are obtained by mixing styrene-based polymers having mainly a syndiotactic configuration or a thermoplastic resin composition containing said styrene-based polymer and a foaming agent, and then heating the resulting mixture. These expanded materials are excellent in heat resistance and are usefully employed in applications where high heat resistance is needed, e.g., as construction materials, buffer materials and so forth.

15 Claims, No Drawings

EXPANDED THERMOPLASTIC RESINOUS MATERIALS AND PROCESS FOR PRODUCTION THEREOF

BACKGROUND OF THE INVENTION

1. Field of the Invention

The present invention relates to expanded thermoplastic resinous materials and a process for production thereof. More particularly, it is concerned with expanded thermoplastic resinous materials with excellent heat resistance, as obtained using styrene-based polymers having a mainly syndiotactic configuration, and a process for efficiently producing expanded materials from thermoplastic resins.

2. Description of the Related Art

Expanded materials obtained using styrene-based polymers having atactic configuration or olefin-based polymers such as polyethylene are well known. In particular, expanded materials obtained by using styrene-based polymers having the atactic configuration are widely used as expanded polystyrene or foamed polystyrene.

These expanded materials from polystyrene and polyethylene resins are unsatisfactory in heat resistance although those with low expansion ratio are used as construction materials, i.e., artificial wood and those with high expansion ratios are used as heat insulation materials. More particularly, expanded polystyrene is subject to thermal deformation when the temperature exceeds 100° C. which is the glass transition temperature of atactic polystyrene. Also, expanded polyethylene is subject to thermal deformation when the temperature exceeds 135° C.

Previous inventors have succeeded in developing styrene-based polymers having high syndiotacticity and further provided compositions containing styrene-based polymers having high syndiotacticity. These results have been previously disclosed in Japanese Patent Application Laid-Open Nos. 104818/1987, 257948/1987 and 257950/1987.

These styrene-based polymers having syndiotactic configuration or compositions thereof are excellent in properties such as mechanical strength and heat resistance, as compared with styrene-based polymers having atactic configuration or their compositions.

Further investigations based on the above findings have shown that when styrene-based polymers having syndiotactic configuration or compositions thereof are expanded using a foaming agent, expanded materials which have much greater heat resistance than conventional expanded polystyrene resins, can be obtained.

SUMMARY OF THE INVENTION

An object of the present invention is to provide expanded materials from thermoplastic resins which are excellent in heat resistance.

Another object of the present invention is to provide expanded materials from thermoplastic resins which are excellent in heat resistance and have a desired expansion ratio.

Still another object of the present invention is to provide a process for efficiently producing the above expanded materials from thermoplastic resins.

The present invention relates to expanded thermoplastic resinous materials obtained by heating a mixture of a styrene-based polymer having mainly a syndiotactic configuration or a thermoplastic resin composition containing the styrene-based polymers, and a foaming agent.

The present invention further relates to a process for producing expanded thermoplastic resinous material which comprises heating a styrene-based polymer having syndiotactic configuration or a thermoplastic resin composition containing the styrene-based polymers in the presence of a foaming agent.

DESCRIPTION OF PREFERRED EMBODIMENTS

In the present invention, styrene-based polymers having mainly syndiotactic configuration or thermoplastic resin compositions containing the styrene-based polymers are used as raw materials. The term "styrene-based polymer having mainly syndiotactic configuration", refers to a polymer of styrene or ring substituted styrene monomers having mainly a stereostructure such that phenyl groups or substituted phenyl groups as side chains are located alternately at opposite positions relative to the main chain composed of carbon-carbon bonds. The tacticity is quantitatively determined by a nuclear magnetic resonance method using a carbon isotope $^{13}$C-NMR method). The tacticity as determined by the 13C-NMR method is indicated in terms of proportions of structural units continuously connected to each other, i.e., a diad in which two structural units are linked to each other, a triad in which three structural units are linked to each other, and a pentad in which five structural units are linked to each other. The styrene-based polymer having mainly syndiotactic configuration preferably has a syndiotactic configuration such that the proportion in a diad (racemi diad) is at least 75% and preferably at least 85%. Most preferably the proportion of syndiotactic configuration in a pentad (racemi pentad) is at least 30% and preferably at least 50%. The styrene-based polymer includes polystyrene, poly($C_{1-4}$ alkylstyrene), poly(halogenated styrene), poly($C_{1-4}$ alkoxystyrene), poly(vinyl benzoate), and their mixtures, and copolymers containing the above polymers as main components.

The poly(alkylstyrene) includes polymethylstyrene, polyethylstyrene, polyisopropylstyrene, and poly(tert-butylstyrene) having the alkyl groups in the ortho-, meta- or para- position. The poly(halogenated styrene) includes polychlorostyrene, polybromostyrene, and polyfluorostyrene having the halo group in the ortho-, meta- or para- position. The poly(alkoxystyrene) includes polymethoxystyrene and polyethoxystyrene having the alkoxy group in the ortho-, meta- or para-position. Of these polymers, polystyrene, poly(p-methylstyrene), poly(m-methylstyrene), poly(p-tertbutylstyrene), poly(p-chlorostyrene), poly(m-chlorostyrene), poly(p-fluorostyrene), and a copolymer of styrene and p-methylstyrene are most preferable.

The styrene-based polymer to be used in the present invention is not critical in molecular weight. The weight average molecular weight is preferably at least 10,000 and particularly preferably at least 50,000. The molecular weight distribution is not critical and may be narrow or wide.

The styrene-based polymers to be used in the present invention can be produced, for example, by polymerizing styrene-based monomers (corresponding to the above styrene-based polymers) with the use of a catalyst containing a titanium compound, and a condensate of water and trialkylaluminum in the presence of an inert hydrocarbon solvent or in the absence of a solvent (Japanese Patent Application Laid-Open No. 187708/1987).

A styrene-based polymer having mainly syndiotactic configuration, or a thermoplastic resin composition obtained by adding other components to such styrene-based polymer, is used as the base raw material in production of the expanded material of the present invention. Other components which can be used in combination with these styrene-based polymers include rubber-like polymers and thermoplastic resins other than these styrene-based polymers. In addition, various additives such as lubricants, antioxidants, inorganic fillers, ultraviolet ray absorbers, heat stabilizers, flame retardants, antistatic agents, nucleating agents, dye and pigment can be added.

Various rubber-like polymers can be used. The most suitable are rubber-like copolymers containing a styrene-based compound as one component, e.g., rubber obtained by completely or partially hydrogenating the butadiene portion of a styrene-butadiene block copolymer (SEBS), styrene-butadiene copolymer rubber (SBR), methyl acrylate-butadiene-styrene copolymer rubber, acrylonitrile-butadiene-styrene copolymer rubber (ABS rubber), acrylonitrile-alkyl acrylate-butadiene-styrene copolymer rubber (AABS), methyl methacrylate-alkyl acrylate-styrene copolymer rubber (MAS), and methyl methacrylate-alkyl acrylate-butadiene-styrene copolymer rubber (MABS). Since these polymers all contain a styrene unit, they exhibit good dispersibility in the styrene-based polymers having mainly syndiotactic configuration and thus greatly improve physical properties. Other examples of rubber-like polymers which can be used include natural rubber, polybutadiene, polyisoprene, polyisobutylene, neoprene, ethylene-propylene copolymer rubber, polysulfide rubber, thiokol, acryl rubber, urethane rubber, silicone rubber, epichlorohydrin rubber, polyetherester rubber, and polyesterester rubber.

Various thermoplastic resins, other than the above styrene-based polymers, can be used depending on the purpose of the expanded material and so forth. For example, as well as styrene-based polymers such as atactic polystyrenes, isotactic polystyrenes, AS resins and ABS resins, condensation polymers such as polyester (e.g., polyethylene terephthalate), polycarbonate, polyether (e.g., polyphenylene oxide, polysulfone and polyethersulfone), polyamide, and polyoxymethylene, acrylate polymers such as polyacrylic acid, polyacrylate, and polymethyl methacrylate, polyolefin such as polyethylene, polypropylene, polybutene, poly(4-methylpentene-1), and an ethylene-propylene copolymer, or halogen-containing compound polymers such as polyvinyl chloride, polyvinylidene chloride, and polyvinylidene fluoride can be used.

Of these, atactic polystyrene, isotactic polystyrene, polyphenylene ether (PPO) or mixture thereof is compatible with syndiotactic polystyrene (styrene-based polymer having mainly syndiotactic configuration) and, therefore, the viscosity and rate of crystallization can be controlled at the time of melting. By appropriately choosing the amount, type and molecular weight of the above polymers, the expansion molding method used in the conventional crystalline resins (e.g., polyethylene and polypropylene) and non-crystalline resins (e.g., atactic polystyrene and polyvinyl chloride) can be applied.

Although there are no special limitations on the amounts of rubber-like polymer and thermoplastic resin used, the amount of rubber-like polymer is suitably chosen as a ratio of not more than 100 parts by weight, preferably 5 to 7 parts by weight per 100 parts by weight of the styrene-based polymer having syndiotactic configuration, and the amount of the thermoplastic resin is suitably chosen as a ratio of not more than 1,000 parts by weight, preferably 1 to 200 parts by weight per 100 parts by weight of the styrene-based polymer having syndiotactic configuration.

In the present invention, the styrene-based polymer having syndiotactic configuration or a thermoplastic resin composition comprising a styrene-based polymer having syndiotactic configuration and the rubber-like polymer or other thermoplastic resin is used as the base material, and a foaming agent is added thereto. In foaming, the above base material is heated in the presence of a foaming agent.

The foaming agent may be mixed with the base material before forming (expanding) or at the time of forming. The method of mixing a foaming agent before foaming includes, for example, a method in which the foaming agent is mixed at the time of producing the styrene-based polymer having syndiotactic configuration by polymerizing the styrene-based monomer, a method in which a polymer powder as the base material is impregnated with a foaming agent, and a method in which a foaming agent is dry blended with the polymer powder or pellets.

When the impregnation method is employed, impregnation properties can be improved by blending the aforementioned resins. For example, by adding a small amount of atactic polystyrene, impregnation properties of a liquid foaming agent, particularly a solvent can be improved. Methods of mixing foaming agents at foaming include, for example, those in which a foaming agent is dry blended with the polymer powder or pellets, and those in which the foaming agent which is gaseous at room temperature, e.g., propylene, methyl chloride or a chlorofluorocarbon gas is blown from an intermediate point of an extrusion screw of a molding machine.

In the present invention, the foaming can be produced by first producing an expandable styrene-based polymer or resin composition by the heat foaming mentioned above and then molding by various methods. It can be also produced by heat foaming in which foaming and molding are carried out at the same time.

The above molding or heat foaming can be carried out by known techniques such as fusion molding, extrusion foaming or injection foaming.

The molding temperature employed in heat foaming according to the present invention is 200° to 330° C. and preferably 260° to 310° C., when the material being foamed is the styrene-based polymer having syndiotactic configuration, and it is 120° to 330° C. and preferably 150° to 310° C., when the material being foamed is a thermoplastic resin composition comprising the styrene-based polymer and the rubber-like polymer or other thermoplastic resin.

There are no special limitations to the foaming agent to be used in the present invention. One or more of the commonly used volatile foaming agents or decomposable foaming agents can be employed alone or in combination. The foaming agent can be used in combination with a foaming aid, e.g., a foaming accelerator, a foaming retarder or a foaming nucleating agent.

As the volatile foaming agent, a wide variety of fluids can be used which do not dissolve or swell the styrene-based polymer having syndiotactic configuration at room temperature under atmospheric pressure, and which further have a boiling point lower than the heat molding temperature (150° to 310° C.) of the base material. Examples of volatile foaming agents which are liquid at room temperature are hydrocarbons, alcohols, esters, ethers, ketones, and halogenated hydrocarbons. Preferred examples are saturated hydrocarbons having 5 to 14 carbon atoms, e.g., hexane, heptane, octane and decane, Examples of volatile foaming agents which are gaseous at room temperature are propane, methyl chloride, fluorocarbons and fluorochlorocarbons (e.g., CFC112, CFC142-b, HCFC141-b, etc.).

As the decomposable foaming agent, various compound can be used as long as they are stable at room temperature and have a decomposition temperature which is below the heat molding temperature (150° to 310° C.) of the styrene-base material to be used, and when decomposed, produce gas such as nitrogen gas. Such decomposable foaming agents can be divided into two groups' inorganic foaming agents and organic foaming agents. Examples of inorganic foaming agents are sodium hydrogencarbonate, ammonium carbonate, ammonium hydrogencarbonate, azide compounds ((e.g., $CaN_6$ and $BaN_6$). and ammonium nitrite. Examples of organic foaming agents hydrazine-benzyl condensates, organic carbonylazide, azobisalkyl phosphonate, tetrahydrodioxazine and the like, and more specifically, azodicarbonamide (ADCA), azobisformamide (ABFA), azobisisobutyronitrile (AZDN), diazoaminobenzene (DAB), N,N'-dinitropentamethylenetetramine (DPT), N,N'-dimethyl-N,N'-dinitroterephthalamide (DMDNTA), benzenesulfonylhydrazide (BSH), p-toluenesulfonylhydrazide (TSH), p',p'-oxybisbenzenesulfonylhydrazide (OBSH), p-toluenesulfonylsemicarbazide, oxazylhydrazide, nitroguanidine, hydrazodicarbonamide, barium azodicarboxylate, trihydrazinotriazine and the like.

The amount of the foaming agent added varies with the type and expansion ratio of the foamed material to be produced, and so forth, and can be determined appropriately depending on circumstances. The foaming agent is usually added in an amount of 0.05 to 50 parts by weight, and preferably 0.1 to 35 parts by weight, per 100 parts by weight of the styrene-based polymer having syndiotactic configuration.

If necessary, a foaming aid can be added to the foaming agent for improved foaming performance. Suitable foaming aids giving accelerated foam generation include citric acid when the foaming agent is sodium hydrogencarbonate; combination of urea and fatty acid ammonium salt, or phthalic acid monoureido, when the foaming agent is DPT; and boric acid salts, when the foaming agent is OBSH. In addition, other known foaming accelerators can be used. The foaming aid which acts as a foaming nucleating agent is added to achieve fine and uniform expansion. For example, metal soaps, e.g., magnesium stearate, and inorganic substances such as silica and talc can be used.

The expanded material of the present invention has an expansion ratio of 1.2 to 80, a crystallinity of at least 20%, a density of 0.84 to 0.013 g/cm³ and a melting point of 150° to 330° C., and is excellent in heat resistance. If the expansion ratio is less than 1.2, characteristics such as light weight and heat insulation cannot be obtained, and also cell size variation may occur, and thus physical properties and appearance of the resulting foamed material are inferior to conventional foamed materials. On the other hand, if the expansion ratio is more than 80, the expanded material lacks dimensional stability and may be unsuitable for practical use owing to a reduction in physical strength and other properties. If the crystallinity is less than 20%, improved heat resistance is lacking.

The expanded material of the present invention is not critical in form or shape. For example, it may be in the form of beads, sheets, cups, trays or slabs, and other three-dimensional moldings and the like. In addition beads or sheets of the material may be post shaped in a suitable heated mold to form thermoformed objects. Multiple strands of the resin may be simultaneously extruded and coalesced into a unitary structure upon foaming to form objects having varying densities.

In the present invention, expanded materials from thermoplastic resins having a desired expansion ratio and excellent heat resistance can be easily obtained. As described above, these expanded materials from thermoplastic resins have a density of 0.84 to 0.013 and a melting point of 150° to 330° C. The expanded materials of the present invention can be used as construction materials, heat insulation materials, buffer materials and so forth in applications which require a high heat resistance.

The present invention is described in greater detail with reference to the following examples.

REFERENCE EXAMPLE 1

Production of Polystyrene having mainly Syndiotactic Configuration

In a reactor were placed 2 L (L=liter) of toluene as a solvent, and 5 mmol of tetraethoxytitanium and 500 mmol (calculated as aluminum atom) of methylaluminoxane as catalyst components, and 15 L of styrene was introduced and polymerized for 4 hours at 50° C.

After the polymerization, the reaction product was washed with a mixture of hydrochloric acid and methanol to decompose and remove the catalyst components, and then dried to obtain 2.5 kg of a styrene-based polymer (polystyrene). This polymer was extracted with methyl ethyl ketone as a solvent in a Soxhlet extractor to obtain an extraction residue of 95% by weight. The weight average molecular weight of the extraction residue was 800,000. In a $^{13}$C-NMR analysis (solvent: 1,2-dichlorobenzene) of the polymer, a signal at 145.35 ppm as assigned to the syndiotactic configuration was observed, and the syndiotacticity in the racemi pentad, as determined based on the peak area, was 96%.

EXAMPLE 1

In a mixed solvent of 40 parts by weight of hexane and 60 parts by weight of methanol, 500 parts by weight of the polystyrene powder obtained in Reference Example 1 was placed for 24 hours at 25° C. to impregnate with the mixed solvent as a volatile liquid. Then, 3 g of this polystyrene powder impregnated with the volatile liquid was placed in a die (10 cm×10 cm×0.3 cm volume) for fusion compress molding and maintained at 290° C. for 3 minutes, whereupon a foamed material was obtained. The effective expansion ratio was determined by the following equation.

$$\text{Effective Expansion Ratio} = \frac{\rho_0 - \rho}{\rho_0} \times 100 \, (\%)$$

where $\rho_0$: Density of Molding not subjected to expansion treatment (g/cm$^3$)

$\rho$: Density of expanded material (g/cm$^3$)

In order to examine thermal properties, the melting temperature and crystallinity were measured using a differential scanning calorimeter (DSC). The results are shown in Table 1.

EXAMPLE 2

To 100 parts by weight of the polystyrene powder obtained in Reference Example 1 were added 1 part by weight of talc (trade name: FFR; average particle diameter: 0.6 μm; produced by Asada Seifun Co., Ltd.) as a foaming nucleating agent, 0.7 part by weight of bis(2,4-di-tert-butylphenyl)pentaerythritol diphosphite (trade name PEP-24; produced by Adeka Agas Co., Ltd.) as an antioxidant and 0.1 part by weight of tetraquis(methylene(3,5-di-tert-butyl-4-hydroxyhydrocinnamate))methane (trade name: AO-60; produced by Adeka Agas Co., Ltd), and the resulting mixture was pelletized by the use of a single screw extruder. These pellets were placed in an autoclave and 400 parts by weight of decane was added thereto. The resulting mixture was heated to 174° C. and stirred for 48 hours while boiling and, thereafter, dried with air to obtain expandable polystyrene pellets (beads). These pellets were extrusion molded in a sheet form at 290° C. by the use of an extrusion molding machine equipped with a T die. The density and melting point of the sheet thus obtained were measured. The results are shown in Table 1.

EXAMPLE 3

The expandable polystyrene pellets obtained in Example 2 were melted at a resin temperature of 300° C. and a mold temperature of 160° C. by the use of a mini-mat injection molding machine (produced by Sumitomo Juki Co., Ltd) to obtain JIS-1 (¼) type tensile testpiece. The density and fusion temperature of this testpiece was measured. The results are shown in Table 1.

EXAMPLE 4

To 40 parts by weight of the polystyrene powder obtained in Reference Example 1 were added 40 parts by weight of polystyrene having atactic configuration (trade name: Idemitsu Styrol US-300; produced by Idemitsu Petrochemical Co., Ltd.), 20 parts by weight of SEBS rubber (trade name: G1652; produced by Shell Kagaku Co., Ltd.), 0.5 part by weight of magnesium stearate as a foaming nucleating agent, 0.7 part by weight of bis(2,4-di-tert-butylphenyl)pentaerythritol diphosphite (trade name: PEP-24; produced by Adeka Argus Chemical Co., Ltd.) as an antioxidant, and 0.1 part by weight of tetrakis(methylene(3,5-di-tert-butyl-4-hydroxyhydrocinnamate))methane (trade name: AO-60; produced by Adeka Argus Chemical Co., Ltd.), and the resulting mixture was pelletized at 290° C. by the use of a single screw extruder.

To 100 parts by weight of the pellets was added 5 parts by weight of azodicarbonamide, which were dry blended. The resulting mixture was extrusion molded into a sheet form in the same manner as in Example 2. The results are shown in Table 1.

EXAMPLE 5

To 100 parts by weight of the liquid impregnated polystyrene powder obtained in Example 1 were added 0.4 part by weight of sodium hydrogencarbonate as a foaming agent and 0.2 part by weight of citric acid as a foaming aid, which were then dry blended. The resulting mixture was compression molded in the same manner as in Example 1. The results are shown in Table 1.

EXAMPLE 6

In pelletization of the polystyrene powder obtained in Reference Example 1, by the use of a single screw extruder, propylene gas was introduced under a pressure of 10 kg along with the polystyrene powder through a closed, pressure resistant hopper to produce expandable polystyrene pellets containing the propylene gas. The expandable polystyrene pellets were fusion compress molded in the same manner as in Example 1. The results are shown in Table 1.

REFERENCE EXAMPLE 2

Production of Polystyrene having mainly Syndiotactic Configuration

In a reactor were placed 1 L of hexane as a solvent, and 0.75 mmol of tetraethoxytitanium and 75 mmol (based on aluminum content) of methylaluminoxane as catalyst components, and 5 L of styrene was introduced and polymerized for 2 hours at 50° C.

After the polymerization, the product was washed with a mixture of hydrochloric acid and methanol to decompose and remove the catalyst components, and then dried to obtain 108 g of a styrene-based polymer (polystyrene). This polymer was extracted with methyl ethyl ketone in a Soxhlet extractor to obtain an extraction residue of 95% by weight. This extraction residue had a weight average molecular weight of 420,000, a number average molecular weight of 196,000 and a melting point of 270° C. In a $^{13}$C-NMR analysis (solvent: 1,2-dichlorobenzene) of the polymer, a signal at 145.35 ppm as assigned to the syndiotactic configuration was observed. The syndiotacticity in the racemi pentad, as calculated from the peak area, was 95%.

EXAMPLE 7

The polystyrene obtained in Reference Example 2 was impregnated with hexane and then dried to obtain a hexane-containing polystyrene powder.

This hexane-containing polystyrene powder was injection molded in the same manner as in Example 3. The results are shown in Table 1.

COMPARATIVE EXAMPLE 1

To 100 parts by weight of the polystyrene powder obtained in Reference Example 1 were added 0.7 part by weight of bis(2,4-di-tert-butylphenyl)pentaerythritol diphosphite (trade name: PEP-24; produced by Adeka Agas Co., Ltd.) as an antioxidant, and 0.1 part by weight of tetrakis(methylene (3,5-di-tert-butyl-4-hydroxyhydrocinnamate))methane (trade name: AO-60; produced by Adeka Agas Co., Ltd.), and the resulting mixture was pelletized by the use of a single screw extruder. The pellets were injection molded in the same manner as in Example 3. The results are shown in Table 1.

COMPARATIVE EXAMPLE 2

The procedure of Example 2 was repeated with the exception that polyethylene pellets (trade name: Idemistu Polyethylene 540E; produced by Idemitsu Petrochemical Co., Ltd.) were used in place of the syndiotactic polystyrene pellets. The results are shown in Table 1.

COMPARATIVE EXAMPLE 3

The procedure of Example 2 was repeated with the exception that polystyrene pellets having atactic configuration (trade name: Idemistu Styrol US-300; produced by Idemitsu Petrochemical Co., Ltd.) were used in place of the syndiotactic polystyrene pellets. The results are shown in Table 1.

TABLE 1

| | Physical Properties of Molding | | | | |
|---|---|---|---|---|---|
| No. | Density (g/cm$^3$) | Effective Expansion Ratio (%) | Expansion Ratio (%) | Melting Point (°C.) | Crystallinity (%) |
| Example 1 | 0.70 | 32.7 | 1.5 | 268 | 54 |
| Example 2 | 0.21 | 79.8 | 5 | 268 | 45 |
| Example 3 | 0.25 | 75.9 | 5 | 268 | 48 |
| Example 4 | 0.57 | 45.2 | 2 | 268 | 30 |
| Example 5 | 0.41 | 60.6 | 2.5 | 268 | 53 |
| Example 6 | 0.08 | 92.3 | 13 | 268 | 49 |
| Example 7 | 0.13 | 87.5 | 8 | 272 | 55 |
| Comparative Example 1 | 1.04 | 0 | 1 | 268 | 45 |
| Comparative Example 2 | 0.21 | 77.9*[1] | 5 | 135 | — |
| Comparative Example 3 | 0.20 | 80.8 | 5 | 98*[2] | — |

*[1] Calculated with the density, $\rho_0$, of the polyethylene molded without expansion as 0.95 g/cm$^3$.
*[2] The melting point could not be measured; the glass transition temperature was measured.

What is claimed is:

1. An expanded thermoplastic resinous material obtained by heating a mixture comprising a styrene-based polymer having mainly a syndiotactic configuration and a foaming agent.

2. The expanded material as claimed in claim 1, wherein the amount of the foaming agent is 0.05 to 50 parts by weight per 100 parts by weight of the styrene-based polymer having mainly syndiotactic configuration.

3. The expanded material as claimed in claim 1, which have a density of 0.0125 to 0.87 and a melting point of 150 to 310° C.

4. The expanded material as claimed in claim 1, which has an expansion ratio of 1.2 to 80 and a crystallinity of at least 20%.

5. The expanded material as claimed in claim 1, wherein the thermoplastic resin composition is composed of 100 parts by weight of styrene-based polymer having mainly syndiotactic configuration, 5 to 70 parts by weight of a rubber-like polymer and 1 to 200 parts by weight of a thermoplastic resin other than the styrene-based polymer.

6. The expanded material as claimed in claim 1, in the form of beads, pellets or a sheet.

7. A process for producing an expanded thermoplastic resinous material which comprises heating a mixture comprising a styrene-based polymer having mainly a syndiotactic configuration and a foaming agent.

8. A process according to claim 7, wherein the mixture is heated and expanded in a mold.

9. A process for producing an expanded thermoplastic resinous material which comprises molding while heating a mixture comprising a styrene-based polymer having mainly syndiotactic configuration and a foaming agent.

10. The process of claim 7, further comprising forming the mixture of styrene-based polymer and foaming agent by impregnating a polymer powder with the foaming agent.

11. The process of claim 7, further comprising forming the mixture of styrene-based polymer and foaming agent by dry blending the foaming agent with the styrene-based polymer which is in powder or pellet form.

12. The process of claim 7, further comprising extruding the thermoplastic material in an extruder and wherein forming the mixture of styrene-based polymer and foaming agent comprises blowing the foaming agent into the polymer in the extrusion.

13. The expanded thermoplastic material formed by the process of claim 10.

14. The expanded thermoplastic material formed by the process of claim 11.

15. The expanded thermoplastic material formed by the process of claim 12.

* * * * *